Oct. 28, 1924.

F. ACKERMAN 1,513,473

AUTOMATIC BELT TIGHTENER

Filed June 4, 1923

INVENTOR
Frank Ackerman.
By Bakewell Church
ATTORNEYS

Patented Oct. 28, 1924.

1,513,473

UNITED STATES PATENT OFFICE.

FRANK ACKERMAN, OF ST. LOUIS, MISSOURI, ASSIGNOR TO CURTIS & COMPANY MANUFACTURING COMPANY, OF WELLSTON, MISSOURI, A CORPORATION OF MISSOURI.

AUTOMATIC BELT TIGHTENER.

Application filed June 4, 1923. Serial No. 643,272.

*To all whom it may concern:*

Be it known that I, FRANK ACKERMAN, a citizen of the United States, residing at St. Louis, Missouri, have invented a certain new and useful Improvement in Automatic Belt Tighteners, of which the following is a full, clear, and exact description, such as will enable others skilled in the art to which it appertains to make and use the same.

This invention relates to automatic belt tighteners such as are used for taking up the slack in a driving belt.

One type of automatic belt tightener that is now in general use comprises a belt engaging element carried by a sliding member or swinging member which moves constantly in response to fluctuations in the tension of the belt, thus permitting the belt engaging element to follow up the belt and keep it taut.

Another type of automatic belt tightener that is also in general use comprises a belt engaging element that follows up the belt and takes up the slack in same, and a ratchet device that restricts the movement of the belt engaging element in a direction to relieve the tension on the belt. Both of the above types of belt tighteners are noisy and chatter considerably when in operation because they have sliding or rotating bearings which wear rapidly, owing to the fact that they move constantly in response to momentary fluctuations in the tension of the belt which occur several hundred times per minute, due to constantly changing belt loads, inaccuracy in the pulleys over which the belt runs, variations in the thickness of the belt and protuberances or projections on the belt formed by the belt lacing. The ratchet type of automatic belt tightener has the further objection of subjecting the belt, the pulleys, the shafts and the bearings to excessive strains during intervals when the effective length of the belt is shortened by pulley or belt irregularities, produced, for example, by the lacing in the belt riding up onto the pulley which the belt surrounds, because the ratchet device prevents the belt engaging element from backing off or moving in a direction to relieve the tension on the belt.

The object of my invention is to provide an automatic belt tightener that will not chatter when the belt is in operation and which will maintain a uniform tension on the belt without subjecting any parts of the device to excessive wear and without subjecting the belt, the pulleys, the shafts and the bearings to abnormal strains when the effective length of the belt becomes reduced.

To this end I have devised an automatic belt tightener that is composed of a belt engaging element, preferably a roller that rides on the belt, a resilient supporting means for said belt engaging element that absorbs the constant momentary fluctuations in the tension of the belt, and a shiftable carrier for said resilient supporting means that is normally stationary, but which is capable of moving automatically in a direction to compensate for elongation or stretching of the belt, thereby insuring the belt engaging element following up the belt and keeping it taut, even after the belt has been in use for a long period.

Figure 1 of the drawings is a side elevational view of an automatic belt tightener constructed in accordance with my invention, showing the parts in the position they assume when the device is first arranged in engagement with a driving belt.

Figure 1:
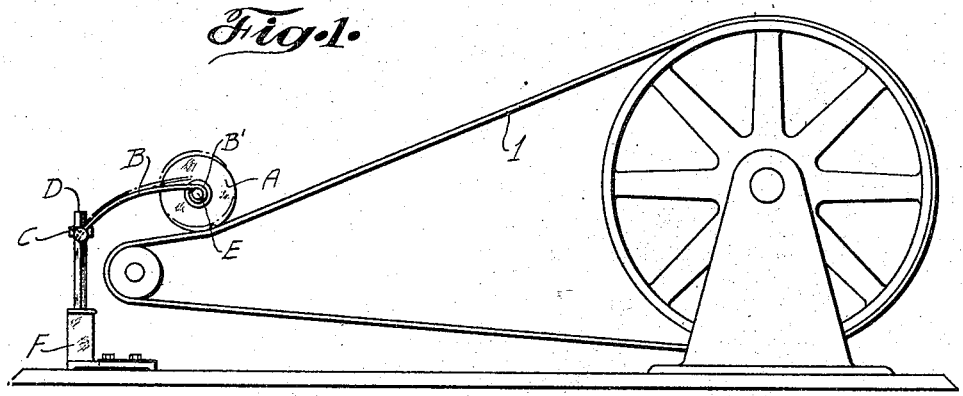
Figure 2:
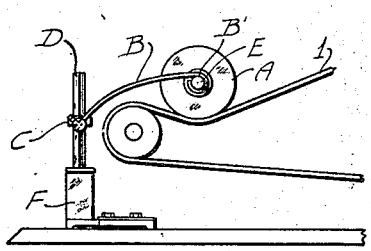
Figure 2 is a similar view, showing the parts in the position they assume after the belt has stretched or become elongated, the shiftable carrier having moved downwardly progressively as the belt stretched.
Figure 3:
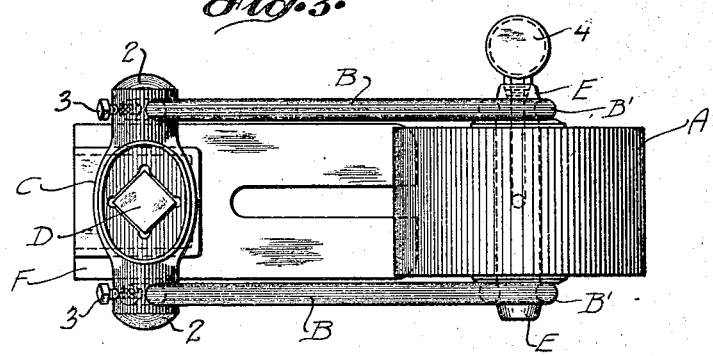
Figure 3 is an enlarged top plan view of my improved belt tightener.
Figure 4:
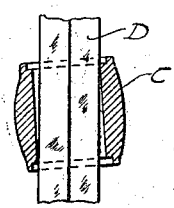
Figure 4 is a detail view, illustrating the clutching action of the carrier on the upright.

Referring to the drawings, 1 designates a driving belt which it is desired to maintain in substantially taut condition, and A designates a belt engaging element, preferably a roller, that rides on said belt. The belt engaging element A is carried by a resilient supporting means B, which, in turn, is sustained by a shiftable carrier C mounted in such a way that it is normally stationary, but is capable of moving bodily in a direction to compensate for elongation or stretching of the belt, thereby causing the belt engaging element A to follow up the belt 1 and take up the slack in same just as efficiently after the belt has become stretched as it did when the device was first arranged in engagement with the belt. The resilient means B of the device and the bodily shiftable carrier C that sustains said means can be formed in various ways without departing from the spirit of my invention, but I prefer to construct the carrier C in the form of a sliding bearing that is loosely mounted on an upright D, and form the resilient means B from two spring arms that project laterally from the carrier C and which are provided at their outer ends with eyes or any other suitable type of bearings B' that receive a horizontally-disposed shaft E on which the roller or belt engaging element A is rotatably mounted. The upright D is carried by a base F and is preferably of such shape in cross section that the carrier C can move vertically without liability of twisting or turning to such an extent as to throw the belt engaging element A out of alignment with the belt or cause said element to bear unevenly on the belt. In the form of my invention herein illustrated the upright D is of substantially rectangular shape in cross section, as shown in Figure 3, and the carrier C has a hole in same of corresponding shape through which the upright D passes. Said hole is of such size with relation to the upright D that when the belt engaging element A is in contact with the belt, the carrier C will be subjected to pressure in a direction causing it to bind on the upright D, and thus remain stationary. In other words, the carrier C is normally locked to the upright D by a cramping action, due to the fact that it is canted or twisted slightly with relation to said upright by the pressure which the belt exerts on said carrier through the belt engaging element A and the resilient arms B. This feature of my invention is shown clearly in Figure 4 of the drawings which illustrates, on an exaggerated scale, how two of the opposed edges of the hole in the carrier C through which the upright D passes grip said upright in such a way as to virtually form a clutch that permits the carrier C to move downwardly, but effectively prevents said carrier from moving upwardly. When the device is first arranged in engagement with the belt, the carrier C will be positioned on the upright D at a point considerably higher than after the belt has become stretched or elongated. Practically speaking, the carrier is locked or fixed on said upright and will not be moved by or affected by the momentary fluctuations in the tension of the belt, due to the fact that the resilient means B absorbs said fluctuations. Each time the belt stretches slightly, however, the pressure which the belt exerts on the carrier C will be relieved sufficiently to unclutch the carrier from the upright D and cause said carrier to move downwardly slightly, thereby compensating for the stretching of the belt and causing the carrier C to move into such a position that the belt will again exert sufficient pressure on the carrier to cause it to bind upon the upright and remain at rest until the belt stretches again. After the belt has been in use for a considerable period, it will be found that the carrier C has moved downwardly from the position shown in Figure 1 into the position shown in Figure 2, due to the stretching of the belt, but the downward movement of said carrier is so gradual that it is not perceptible to the eye of a person observing the operation of the device. Accordingly, the carrier C may be said to consist of a member which is combined with the upright D in such a manner that it is not subjected to movement that causes said member or the upright D to wear, but is capable of movement to compensate for stretching of the belt, thus insuring the belt engaging element A following up the belt and maintaining it in a taut condition at all times. The arms B which carry the roller A have sufficient resiliency to absorb the momentary fluctuations in the tension of the belt and to protect the belt, the pulleys, the shafts and the bearings from excessive strains during the intervals when the effective length of the belt becomes reduced. Accordingly, a belt tightener of the construction above described will automatically take up the slack in a driving belt and maintain a uniform tension on the belt without subjecting the belt, pulleys, shafts and bearings to excessive strains, and without liability of causing the parts of the device to wear to such an extent that the device will chatter when the belt is in operation.

In practice I prefer to make the roller A heavy enough so that it will exert sufficient pressure on the belt to keep the belt taut, but it will, of course, be obvious that other means than gravity can be used to cause the roller A to follow up the belt and take up the slack in same. While it is true that the member C is slidingly mounted on the upright D, said member and upright are not subjected to any appreciable wear, owing to the fact that the member C normally stands at rest and is not affected by the constant up and down movements of the belt engaging element A produced by the fluctuations in the tension of the belt; the up and down movements of said belt engaging element being taken up by the spring arms B which flex constantly, as indicated by broken lines in Figure 1, when the belt is in operation.

I am, of course, aware of the fact that it is old to equip an automatic belt tightener with a resilient device that maintains the belt engaging element in contact with the belt, but in such prior belt tighteners the belt engaging element is carried by a sliding or oscillating part that moves constantly relatively to a bearing or supporting part, due to the fluctuations in the tension of the belt, and thus produces excessive wear on said part or bearing. My improved belt tightener is distinguished from prior belt tighteners of the kind referred to, in that the means which carries the belt engaging element has sufficient inherent resiliency to absorb the constant up and down movements of the belt engaging element produced by fluctuations in the tension of the belt, and the carrier which sustains said means is not subjected to movement that causes it to wear. It is immaterial how the spring arms B are connected to the carrier C, but one convenient way of constructing said parts is to provide the carrier C with laterally-projecting portions 2 equipped with holes for receiving the inner ends of the spring arms B and provided with set screws or other suitable devices 3 for securing said spring arms in position. I also prefer to provide the device with a means, indicated as an entirety by the reference character 4 in Figure 3, for lubricating the shaft E on which the belt engaging roller A revolves.

Having thus described my invention, what I claim as new and desire to secure by Letters Patent is:

1. An automatic belt tightener, comprising a belt engaging element constructed so as to exert sufficient pressure on the belt to keep it taut, and a resilient supporting means for said element that has sufficient inherent resiliency to absorb the movements of said element produced by fluctuations in the tension of the belt.

2. A belt tightener, comprising a belt engaging element, a resilient supporting means for said element, and a bodily movable carrier for said supporting means that shifts automatically in one direction and thus causes the belt engaging element to follow up the belt when the belt becomes elongated.

3. A belt tightener, comprising a belt engaging element, a supporting means for said element that has sufficient inherent resiliency to absorb the constant movements of said element produced by fluctuations in the tension of the belt, and means for permitting said supporting means to move bodily automatically and thus cause the belt engaging element to follow up the belt when the belt becomes elongated.

4. A belt tightener, comprising a belt engaging element, a resilient means on which said element is mounted, a carrier that sustains said means, and a support with which said carrier is combined in such a way that the carrier is normally locked at rest on said support, but will move downwardly thereon as the belt becomes stretched or elongated.

5. A belt tightener, comprising a belt engaging element, a resilient means on which said element is mounted, a carrier that sustains said means, and an upright on which said carrier is mounted and normally held at rest by pressure produced by the tension of the belt.

6. A belt tightener, comprising an upright, a carrier provided with an opening through which said upright passes, a belt engaging element, and a resilient supporting means for said element connected to said carrier and operating to cramp said carrier on said upright and thus cause said carrier to normally remain at rest.

7. A belt tightener, comprising a roller that rides on the belt, a pair of spring arms that support said roller and which have sufficient inherent resiliency to absorb the movements of said roller produced by fluctuations in the tension of the belt, and a normally stationary carrier for said arms that automatically moves downwardly gradually as the belt stretches or becomes elongated.

8. A belt tightener, comprising an upright, a carrier on said upright that is normally locked to same, but which is capable of moving automatically under certain conditions, laterally-projecting portions on said carrier, a pair of arms connected to said laterally-projecting portions that have some inherent resiliency, and a belt engaging roller arranged between and sustained by said arms.

FRANK ACKERMAN.